United States Patent
Bedrosian

(10) Patent No.: US 7,778,167 B2
(45) Date of Patent: Aug. 17, 2010

(54) SIMULATING PACKET DELAY VARIATION USING STEP-TARGET DELAY METHOD

(75) Inventor: Paul Stephan Bedrosian, Andover, MA (US)

(73) Assignee: Agere Systems Inc., Allentown, PA (US)

( * ) Notice: Subject to any disclaimer, the term of this patent is extended or adjusted under 35 U.S.C. 154(b) by 197 days.

(21) Appl. No.: 12/074,154

(22) Filed: Feb. 29, 2008

(65) Prior Publication Data

US 2008/0225747 A1 Sep. 18, 2008

Related U.S. Application Data

(60) Provisional application No. 60/904,728, filed on Mar. 2, 2007.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........................ 370/229; 370/252
(58) Field of Classification Search ............ 370/230.1, 370/235, 252, 392, 395.62, 389, 229; 375/130; 382/251; 455/456.1

See application file for complete search history.

(56) References Cited

U.S. PATENT DOCUMENTS

| | | | |
|---|---|---|---|
| 5,189,667 A * | 2/1993 | Esaki et al. | 370/389 |
| 6,442,166 B1 | 8/2002 | McDonald et al. | |
| 6,571,358 B1 | 5/2003 | Culotta et al. | |
| 7,191,355 B1 | 3/2007 | Ouellette et al. | |
| 7,272,404 B2 * | 9/2007 | Overy et al. | 455/456.1 |
| 7,418,147 B2 * | 8/2008 | Kamaci et al. | 382/251 |
| 7,492,732 B2 | 2/2009 | Aweya et al. | |
| 2003/0091047 A1* | 5/2003 | Pate et al. | 370/392 |
| 2006/0165003 A1 | 7/2006 | Partridge | |
| 2006/0193400 A1 | 8/2006 | Morris et al. | |
| 2008/0080563 A1 | 4/2008 | Kataria et al. | |
| 2008/0262991 A1 | 10/2008 | Kapoor et al. | |
| 2009/0268783 A1* | 10/2009 | Karabinis | 375/130 |

OTHER PUBLICATIONS

"Timing and Synchronization Aspects in Packet Networks", ITU-T Recommendation G.8261/Y.1361 (May 2006).
"Ethernet Network Emulators: GEM,XGEM", High Performance Precision Emulators, Anue Systems, Inc. (Nov. 2007).
S. Kaczmarek, et al., "Methods for Evaluation Packet Delay Distribution of Flows Using Expedited Forwarding PHB", Journal of Telecomm. & Information Technology (Feb. 2004).

* cited by examiner

*Primary Examiner*—Kevin C Harper
*Assistant Examiner*—Leon Andrews

(57) ABSTRACT

A method and system for simulating packet delay variation (PDV) is disclosed. The delay-step method for simulating PDV determines a delay for each packet is a stream of packets generated at a regular interval. Delay target values are randomly selected based on a statistical distribution, such as a Gamma distribution, which models a desired PDV. Delay-steps are determined for each packet based on the delay target values. The delay-steps can be fixed or variable sized steps which are used to adjust the delay of sequential packets. Each of the packets is then transmitted with the delay determined for that packet.

22 Claims, 7 Drawing Sheets

902

904

1002

1004

SIMULATING PACKET DELAY VARIATION USING STEP-TARGET DELAY METHOD

This application claims the benefit of U.S. Provisional Application No. 60/904,728, filed Mar. 2, 2007, the disclosure of which is herein incorporated by reference.

BACKGROUND OF THE INVENTION

The present invention relates generally to simulating data packet networks, and more particularly to simulating packet delay variation (PDV) in data packet networks.

An ongoing development in telecommunications is the convergence of voice, video, and data into a common stream. This requires migrating services typically delivered using a circuit network, such as telephony, to a packet based network. However, in a packet based network, synchronization of such services is difficult because there is no longer a precise network clock traceable signal as in a circuit switched network. The network traceable clock is used to recover the service clock of these circuit switched services (e.g., DS1, E1) to ensure error free-transmission. Circuit switched networks rely on the physical layer to transport these network clock signals between network elements to form a timing chain. The accuracy of these physical layer clock signals are typically synchronized to an accuracy of ±4.6 ppm or better. However, in packet networks, the clock signals used at the physical layer do not form a timing chain but are controlled by local free-running oscillators. Further, the accuracy of physical layer transport clock is synchronized to an accuracy of ±100 ppm. Therefore, the physical layer clock signals in a packet network are not sufficient to support the error-free transport of circuit switched services over a packet network, commonly called circuit emulation. As a result, other methods must be used to recovery the service clock of circuit emulation services. The method of adaptive timing recovery typically relies on the arrival characteristics of packets as a basis to create a suitable service clock for circuit emulation.

It is well known that adaptive timing methods are sensitive to packet delay variation (PDV) in packet based networks. Accordingly, there has been an effort to take PDV into account when performing timing recovery stress testing for determining performance requirements and testing equipment for use in a packet based network. The current methodology for generating PDV is to inject background traffic with various mixes of packet sizes into a connection-oriented series of packet switches. The packet traffic of interest (PTI) then establishes a path through these switches and experiences delays and delay variation on a switch-by-switch basis. The PDV can be measured as the PTI is received after being transmitted through the packet switches. However, the current methodology is not deterministic or repeatable, since different equipment used to conduct tests can lead to different results. The current methodology cannot control metrics used to model the PDV of real-world networks, such as peak-to-peak variation, packet-to-packet variation, histogram probability density, and statistical specifications, such as mean, mode, and standard deviation. Accordingly, a method for generating PDV that can simulate the PDV of a real world network and provide uniform testing is desirable. This capability is needed for a variety of reasons including the creation of standardized testing methods needed to verify compliance with interface requirements for circuit emulation services.

BRIEF SUMMARY OF THE INVENTION

The present invention provides a method and system for simulating packet delay variation (PDV) in a packet-based network. According to embodiments of the present invention, a delay-step method is used for deterministically delaying packets based on a probability distribution function (PDF) in order to simulate a PDV.

In one embodiment of the present invention a stream of packets is received. The stream of packets is generated by generating the packets at regular intervals. A delay is determined for each packet based on a series of delay target values determined based on a statistical distribution. The delay target values are selected randomly based on a PDF of a statistical distribution, such as a Gamma distribution, which is used to model PDV of a packet based network. For each delay target value, a series of sequential packets are adjusted by delay-steps determined based on the delay target value. The delay-steps can have variable or fixed sizes. Each packet in the stream of packets is transmitted with the delay determined for that packet.

These and other advantages of the invention will be apparent to those of ordinary skill in the art by reference to the following detailed description and the accompanying drawings.

DETAILED DESCRIPTION

The present invention is directed to simulating packet delay variation (PDV) using a delay-step method. Embodiments of the present invention describe a framework for establishing metrics that can be used for generating the PDV for packet timing recovery stress testing.

PDV over a significant number of packet delay measurements can be described as having a Gaussian or normal distribution. This practice stems from the central limit theory that states that the distribution of a large number of samples tends to follow a normal distribution. Based on these assumptions, it has been common practice to evaluate packet timing systems using PDV based on a Gaussian probability density function (PDF). However, the choice of a simple Gaussian PDV PDF based on the central limit theory may not be a realistic representation of packets flowing in loaded multi-switch networks. When individual packets traverse active switching elements (packet switches and routers), they experience delays based on queuing, preordination of traffic, and the processing of other background traffic. Accordingly, the delays associated with packet traffic of interest (PTI) may not have the symmetric PDF associated with a Gaussian PDF. As background traffic loading increases, the resulting PDF of the PDV shifts from a symmetric Gaussian distribution to an asymmetric PDF resembling a "Gamma-like" distribution or complex PDF composed of multiple Gamma and other statistical delay distributions. Embodiments of the present invention are described herein using a Gamma distribution as a PDF to model PDV. However, the present invention is not limited to a Gamma distribution, and can be similarly applied to other statistical distributions including complex distributions combining multiple PDFs.

Figure 1:
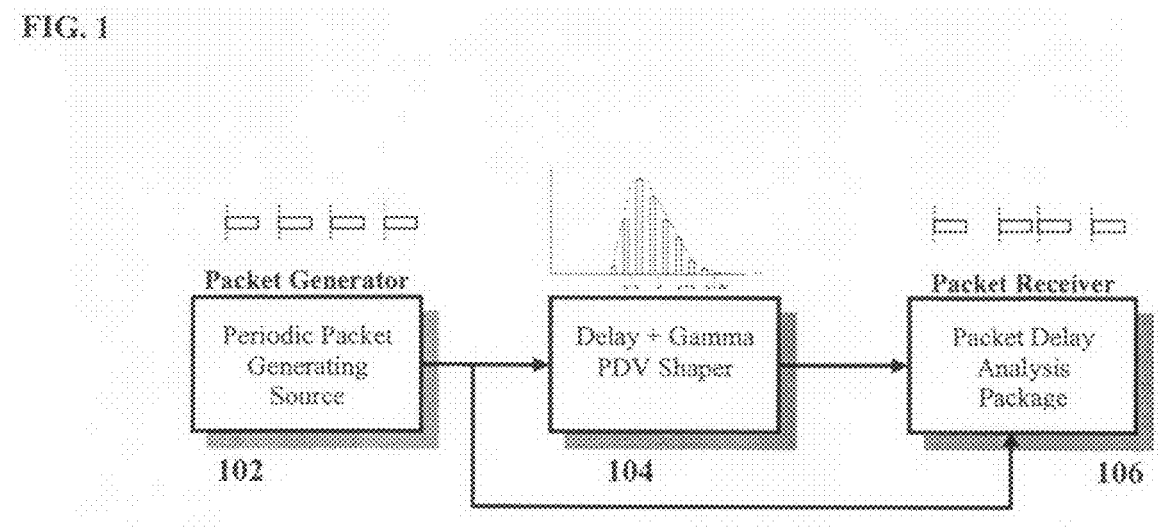
FIG. 1 illustrates a packet delay variation (PDV) simulator according to an embodiment of the present invention.

The Gamma distribution model is based on generating PDV on packet traffic of interest (PTI) and then performing histogram delay analysis. FIG. 1 illustrates a PDV simulator according to an embodiment of the present invention. The PDV simulator can be implemented as an application executed by a processor on a computer system. For example, the PDV simulator can be implemented as a Microsoft Excel application, but the present invention is not limited thereto. The PDV simulator generates a user-defined delay profile for packets occurring at regular (periodic) intervals. The user defined profile for the PDV simulator of FIG. 1 has a Gamma PDF. As illustrated in FIG. 1, the PDV simulator includes a packet generator 102, which is a periodic packet generating source, a PDV generator 104, which shapes the PDV using a Gamma PDF, and a packet receiver 106, which includes a packet delay analysis package.

The packet generator 102 generates packets at regular (periodic) intervals. Each packet is time-stamped with the time $(T_s)$ that the packet was sent. As they are generated, the packets are sent out to the PDV generator 104 and the packet receiver 106. The PDV generator 104 determines the delay and delay variation for each packet and transmits each packet with the corresponding delay to the packet receiver 106. The PDV generator 104 controls the delay and the delay variation of each packet independently. The delay variation is modeled as a Gamma distribution PDF. The Gamma PDF can have a selectable mean and standard deviation, so that the distribution can be controlled by a user to model the distribution to accurately reflect the distribution of PDV in a real world network. The Gamma PDF can also be shifted by a user defined offset. The PDV generator 104 determines the packet delay by calculating a target delay and a delay-step size. The delay-step may be either fixed or variable with a uniform PDF.

The PDV generator 104 produces random delay values that fit a Gamma PDF, using the following equations:

$$D_G(t) = GAMMAINV(U_i(t), \alpha, \beta)$$

$$D_{Total}(t) = D_O + D_G(t)$$

$$\sigma = \beta \sqrt{\alpha}$$

$$\mu_{SG} = \alpha \beta$$

$$\mu_T = \mu_{SG} + D_O$$

where $D_G(t)$ is the packet delay of a standard Gamma PDF, $U_i(t)$ is a random number generator between 0 and 1 with a uniform PDF, $D_{Total}(t)$ is the total delay experienced by the packet, $D_O$ is the delay offset, $\sigma$ is the desired standard deviation of the Gamma PDF, $\mu_{SG}$ is the mean of the standard Gamma PDF, and $\mu_T$ is the mean of the standard Gamma PDF plus the delay offset. The parameters $\alpha$ and $\beta$ of the Gamma PDF are determined based on the desired mean $\mu_{SG}$ and standard deviation $\sigma$ of the Gamma PDF.

Each packet received at the packet receiver 106 from the PDV generator 104 is time-stamped with the time $(T_r)$ at which the packet is received. The packet receiver 106 calculates and plots the total packet delay $(T_r - T_s)$ of each packet. The delay variation (PDV) of a fixed sample (for example, 30,000 packets) can be calculated and plotted as a histogram. The packet delay analysis package of the packet receiver 106 may also further analyze various trends of the received PDV. For example, the packet receiver can calculate the mean, mode, peak-peak variation, or plot other statistical performance metrics including PDV derivative, TDEV or minTDEV.

Figure 2:
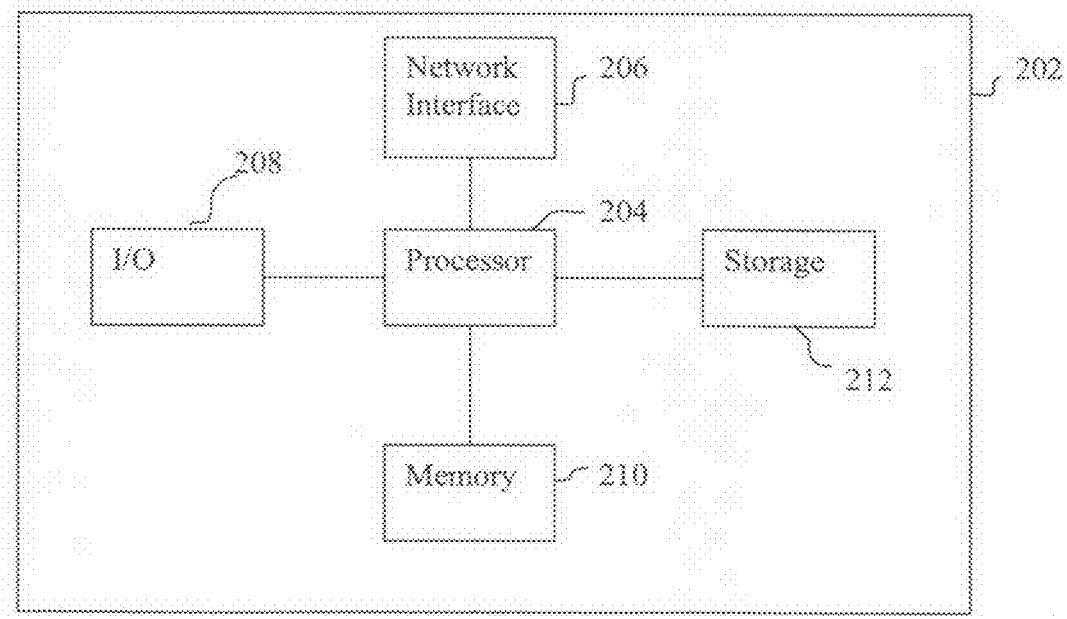
FIG. 2 illustrates a high level block diagram of a computer capable of implementing embodiments of the present invention.

The PDV simulator of FIG. 1 and the steps of the method of FIG. 4 (described below) may be performed by computers containing processors which are executing computer program code which defines the functionality described herein. Such computers are well known in the art, and may be implemented, for example, using well known computer processors, memory units, storage devices, computer software, and other components. A high level block diagram of such a computer is shown in FIG. 2. Computer 202 contains a processor 204 which controls the overall operation of computer 202 by executing computer program instructions which define such operation. The computer program instructions may be stored in a storage device 212 (e.g., magnetic disk) and loaded into memory 210 when execution of the computer program instructions is desired. Thus, the operation of computer 202 is defined by computer program instructions stored in memory 210 and/or storage 212 and the computer 202 will be controlled by processor 204 executing the computer program instructions. Accordingly, computer program instructions for implementing a PDV simulator application, such as the PDV simulator of FIG. 1, can be stored in memory 210 and/or storage 212 and executed by processor 204 executing the computer program instructions. Also, computer program instructions for performing the steps of the method of FIG. 4 can be stored in memory 210 and/or storage 212 and executed by processor 204 executing the computer program instructions. Computer 202 also includes one or more network interfaces 206 for communicating with other devices via a network. Computer 202 also includes input/output 208 which represents devices which allow for user interaction with the computer 202 (e.g., display, keyboard, mouse, speakers, buttons, etc.). One skilled in the art will recognize that an implementation of an actual computer will contain other components as well, and that FIG. 2 is a high level representation of some of the components of such a computer for illustrative purposes. One skilled in the art will also recognize that the functionality described herein may be implemented using hardware, software, and various combinations of hardware and software.

Figure 3:
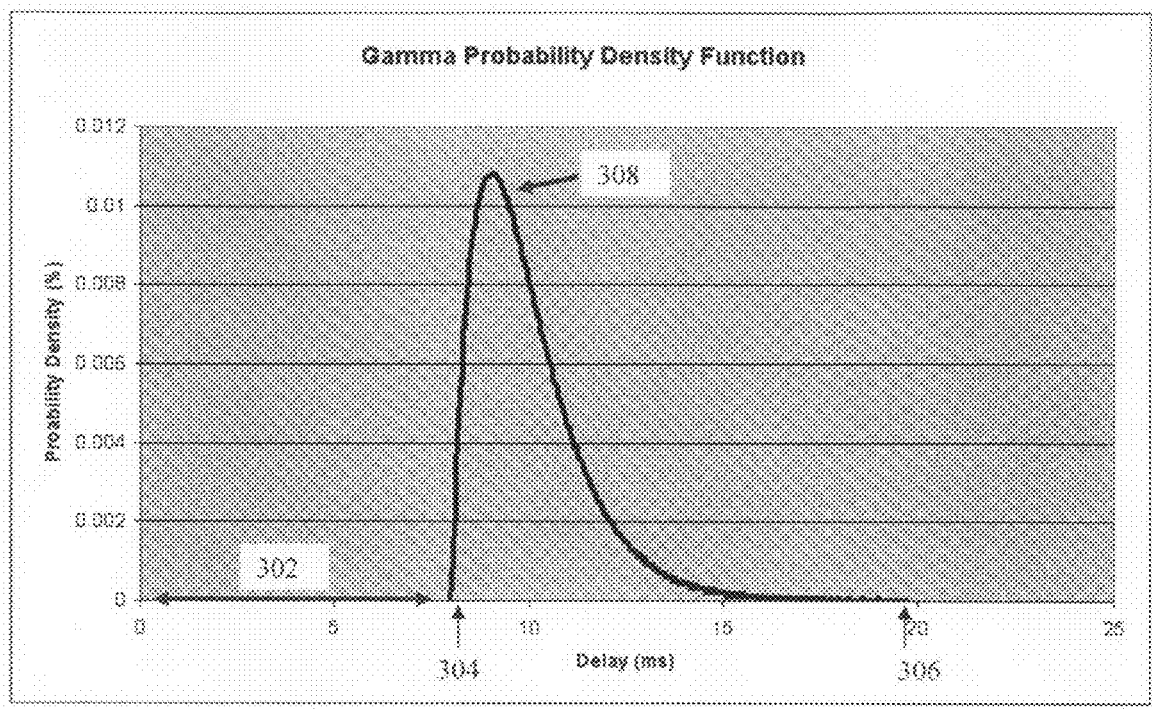
FIG. 3 illustrates a PDV having a Gamma probability density function (PDF)

FIG. 3 illustrates a PDV having a Gamma PDF. As illustrated in FIG. 3, the delay offset $D_O$ of the Gamma PDF is shown at 302, the minimum delay $(D_{MIN})$ is shown at 304, the maximum delay $(D_{MAX})$ is shown at 306, and the mode of the Gamma PDF is shown at 308.

Figure 4:
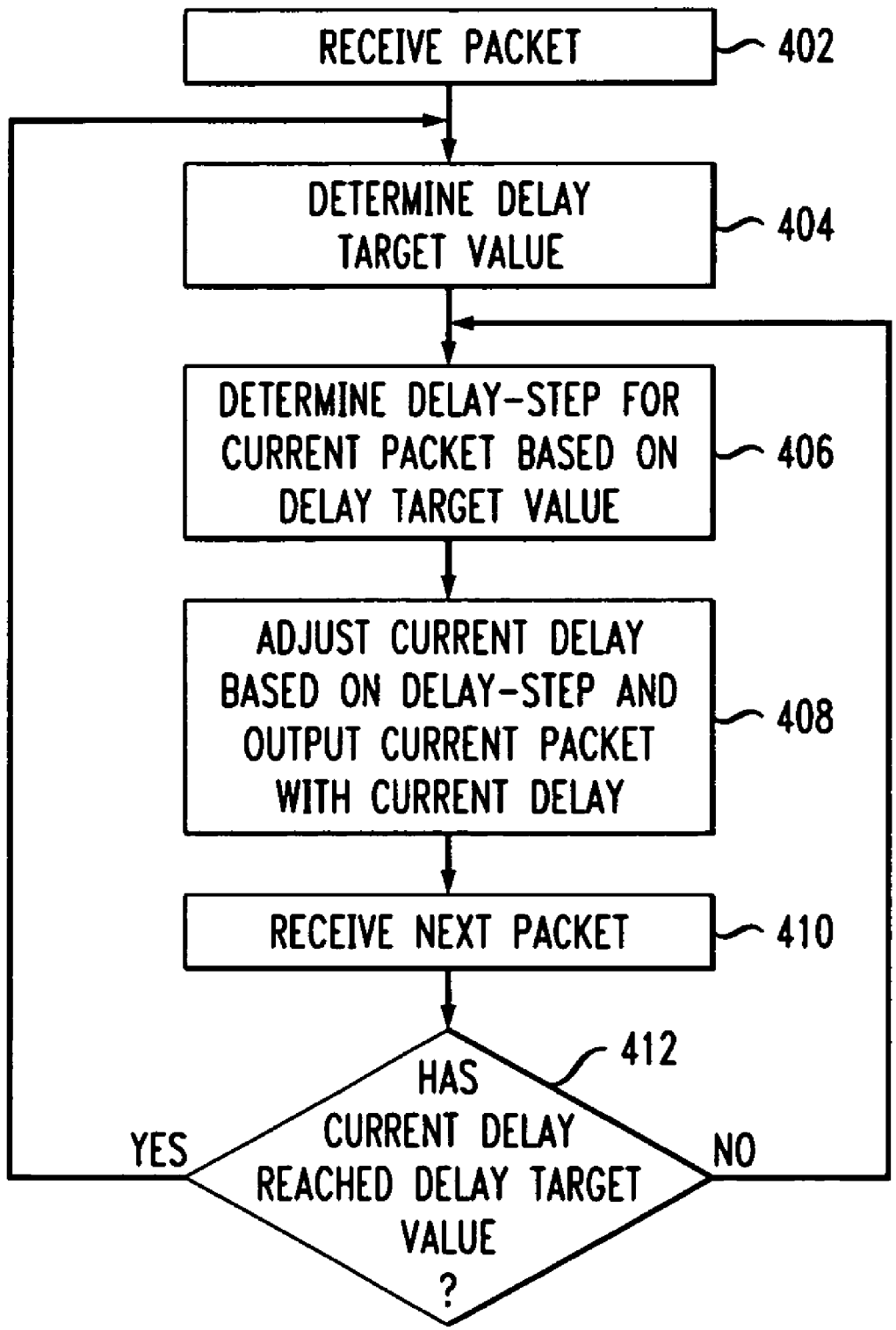
FIG. 4 illustrates a method for simulating PDV according to an embodiment of the present invention.

FIG. 4 illustrates a method for simulating PDV according to an embodiment of the present invention. The method of FIG. 4 can be performed by the PDV generator 104 of FIG. 1. At step 402, a packet is received at the PDV generator 104 from the packet generator 102. As described above, the packet generator generates packets at regular intervals.

At step 404, a target delay value is determined. This delay target may be based on the random statistical computation that fits a desired probability density function. For example, the PDV generator 104 selects a random Gamma delay target value that fits the PDF curve shown in FIG. 3. The target delay may also be based on a deterministic delay value, such as step delay common to a packet path change where the flow of a series of packets changes between two different paths. The target delay value may be based on a combination of random statistical and deterministic processes as described above.

At step 406, a delay-step is determined for the current packet based on the delay target value. The delay-step is an adjustment to a current delay value in order to change the current delay value in a direction towards the delay target value. According to various possible implementations, the delay-step can be calculated using a variable step size or a fixed step size.

According to the variable delay-step size implementation, the delay-step is calculated as a random uniformly distributed value between minimum and maximum step sizes, $D_{step_{MIN}}$ and $D_{step_{MAX}}$, respectively, where $D_{step_{MIN}}$ is negative and $D_{step_{MAX}}$ is positive. If the difference between the current delay and the delay target value is negative (i.e., the delay target value is larger than the current delay), then the step size value is between 0 and $D_{step_{MAX}}$. Otherwise (i.e., if the delay target value is less than the current delay), the step size value is between $D_{step_{MIN}}$ and 0. The step size may be restricted from being larger (in either positive or negative directions) than a step size that will adjust the current delay to match the target delay.

According to the fixed delay-step size implementation, the delay-step is determined to be equal to either $D_{step_{MIN}}$ or $D_{step_{MAX}}$. If the difference between the current delay and the delay target value is negative (i.e., the delay target value is larger than the current delay), then the step size value is $D_{step_{MAX}}$. Otherwise (i.e., if the delay target value is less than the current delay), the step size value is $D_{step_{MIN}}$. In this implementation, when the fixed step size would overshoot the delay target value, then the step size required to adjust the current delay to match the delay target value is used instead of $D_{step_{MIN}}$ or $D_{step_{MAX}}$.

Figure 5:
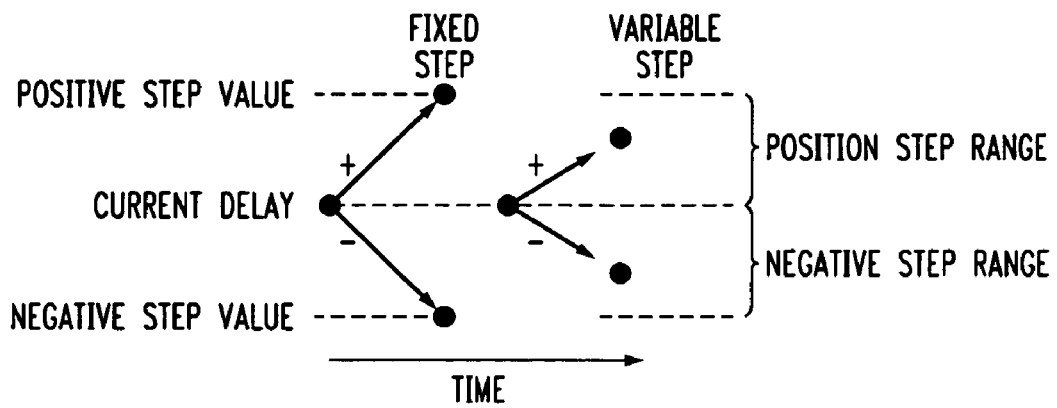
FIG. 5 illustrates delay-steps calculated using fixed and variable delay-step sizes.

FIG. 5 illustrates delay-steps calculated using fixed and variable delay-step sizes. As illustrated in FIG. 5, for fixed delay-steps, a step-size of either a fixed positive step value ($D_{step_{MAX}}$) or a fixed negative step value ($D_{step_{MIN}}$) is used to adjust the current delay, whereas for variable delay-steps, a step within a positive step range (between 0 and $D_{step_{MAX}}$) or within a negative step range (between $D_{step_{MIN}}$ and 0) is used to adjust the current delay.

Returning to FIG. 4, at step 408, the current delay is adjusted by the delay-step, and the current packet is transmitted with the current delay from the PDV generator 104 to the packet receiver 106.

At step 410, the next packet is received at the PDV generator 104 from the packet generator 102. As described above, the packet generator 102 generates the packets at regular intervals.

At step 412, it is determined whether the current delay has reached the delay target value. If the current delay has not reached the delay target value, the delay target value is maintained and the method returns to step 406 and determines a delay-step for the current packet based on the delay target value. If the current delay has reached the delay target value, the method returns to step 404 and determines a new delay target value based on the PDF of the PDV. Accordingly, the method repeatedly calculates delay-steps for subsequent packets based on one delay target value until the delay of a packet reaches that delay target value, then determines a new delay target value and determines delay-steps for subsequent packets to sequentially adjust the delay to the new delay target value. This method is repeated for all of the packets in a sample set.

Figure 6:
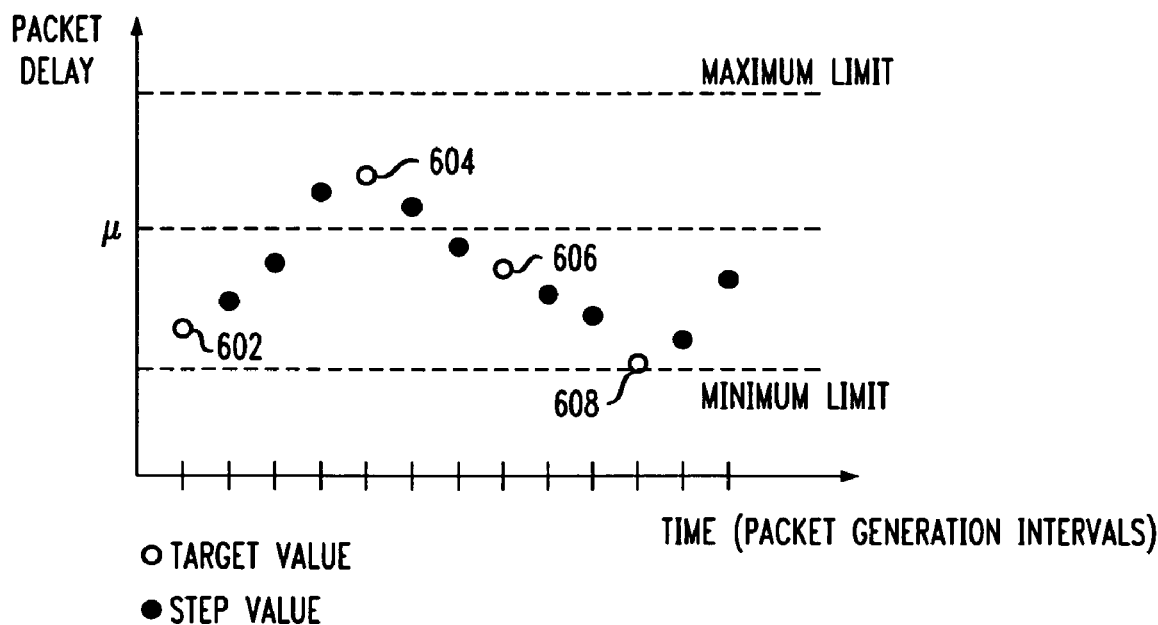
FIG. 6 illustrates repeatedly determining delay target values and applying delay-steps to reach the delay target values.

Although FIG. 4 describes determining a delay-step for each packet once the packet has been received, it is possible to determine all of the delay-step values (based on various delay target values), and add the delay-step values at specific intervals to simulate the packet arrivals. FIG. 6 illustrates repeatedly determining random Gamma delay target values and applying delay-steps to reach the delay target values. As illustrated in FIG. 6, μ is the mean of the PDF shown in FIG. 3. The maximum and minimum limits for the packet delay correspond to the $D_{MIN}$ 304 and $D_{MAX}$ 306 of FIG. 3. Delay target values 602, 604, 606, and 608 are determined and various delay-steps are used to reach the delay target values 602, 604, 606, and 608.

The packet delay values can be analyzed using a 400 point histogram graph. The resolution of the histogram is related to the PDV range by the following equation:

$$\text{PDV\_Resolution} = \frac{D_{MAX} - D_{MIN}}{400}.$$

The derivative of the PDV can also be calculated and analyzed. The derivative PDV can be calculated using the following equation:

$$\text{D\_PDV}(t) = \frac{D_n(t) - D_n(t-1)}{\tau},$$

where τ is the packet generation period. The derivative PDV values can then be analyzed by using a 400 point histogram graph. The resolution of the histogram is related to the derivative PDV range by the following equation:

$$\text{D\_PDV\_Resolution} = \frac{\text{D\_PDV}_{MAX} - \text{D\_PDV}_{MIN}}{400}.$$

Although the values of the derivative PDV are presented as a histogram, they can also be presented and analyzed in various other formats as well.

FIGS. 7-12 illustrate various PDV simulation results of a PDV simulation using the method of FIG. 4 with variable and fixed delay-step sizes. These results are for a PDV simulation using the following parameters:

$$\left. \begin{array}{l} \mu_{SG} = 2 \text{ ms} \\ \sigma = .5 \text{ ms} \end{array} \right\} \begin{array}{l} \alpha = 16 \\ \beta = .125 \end{array}$$

$$\mu_T = 10 \text{ ms}$$

$$D_{step_{MAX}} = 100 \text{ μs}$$

$$D_{step_{MIN}} = -100 \text{ μs}$$

Packet Generation Rate = 1000/sec.

Figure 7:
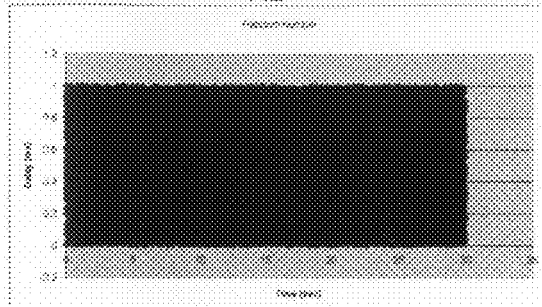
FIG. 7 illustrates random number generation used in the PDV simulation.
Figure 7:
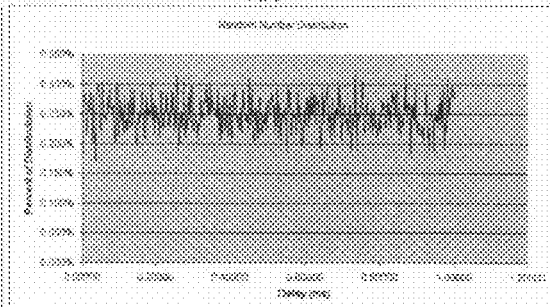

FIG. 7 illustrates random number generation used in the PDV simulation. Graph 702 shows a plot of the random number generator $U_i(t)$ over time, and graph 704 shows a histogram of the PDF of the random number generator $U_i(t)$.

As shown in 702 and 704, PDF distribution of the random number generator $U_i(t)$ is relatively uniform between 0 and 1.

Figure 8:
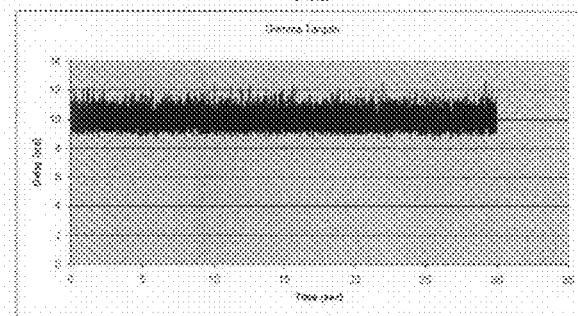
FIG. 8 illustrates Gamma PDV delay target generation.
Figure 8:
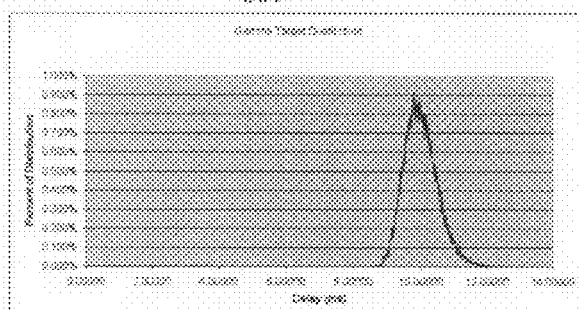

FIG. 8 illustrates Gamma PDV delay target generation. Graph 802 shows the Gamma PDV delay targets displayed over time, and graph 804 shows a PDF histogram for the Gamma delay target distribution. The delay target values in graphs 802 and 804 include both the $D_G(t)$ and $D_O$ delay components. As illustrated in graphs 802 and 804, because of the short time duration of the simulation, there are very few values that actually achieve the min and max delay value. As shown in graph 804, the PDF histogram shows the classic Gamma distribution of the delay target values. The actual analysis of this histogram places $\mu_T$ at 9.99 ms (−0.1% error), $\sigma$ at 0.503 ms (0.6% error), $D_{MIN}$=8.507 ms, $D_{MAX}$=12.59 ms.

Figure 9:
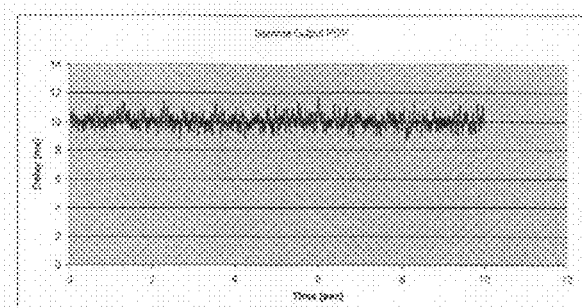
FIG. 9 illustrates PDV generation using variable delay-steps.
Figure 9:
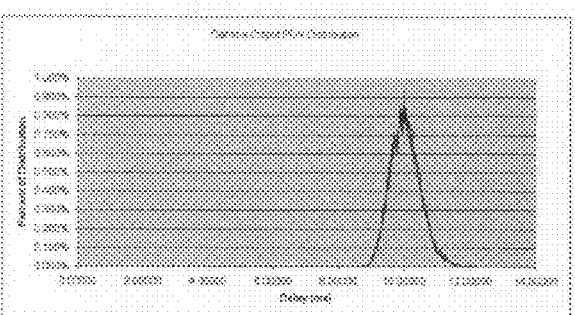

FIG. 9 illustrates PDV generation using variable delay-steps. The graphs of FIG. 9 show the actual PDV as seen by the packet receiver 106. Graph 902 shows the PDV displayed over time, and graph 904 shows the PDF histogram of these delays. The delay-step changes that the packets have experienced are uniformly variable between a ±100 μs range. Since these output delay values include the step changes as well as the target PDV values, there will be fewer delay values that achieve either the min or max PDV values. Accordingly, the accuracy of the statistical distribution increases with the number delay samples processed. The actual analysis of this histogram places $\mu_T$ at 10.07 ms (0.7% error), $\sigma$ at 0.483 ms (−3.4% error), $D_{MIN}$=8.67 ms, $D_{MAX}$=12.86 ms.

Figure 10:
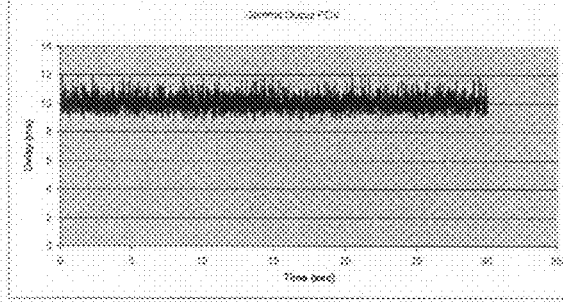
FIG. 10 illustrates PDV generation using fixed delay-steps.
Figure 10:
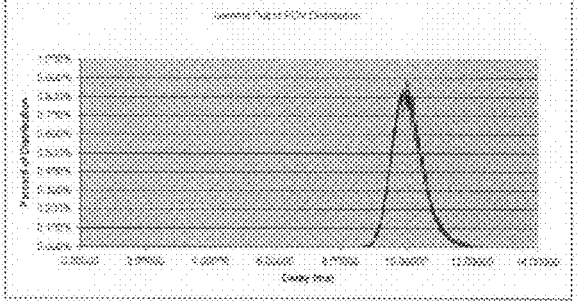

FIG. 10 illustrates PDV generation using fixed delay-steps. The graphs of FIG. 10 show the actual PDV as seen by the packet receiver 106. Graph 1002 shows the PDV displayed over time, and graph 1004 shows the PDF histogram of these delays. The delay-step changes that these packets have experienced are typically fixed between a ±100 μs range. As in the variable step case, the output delay values include both the step changes as well as the target PDV values. However, since the average step value size is larger than in the variable step case, there are fewer steps between target values. If one compares the $D_{Total}(t)$ vs. time plots shown in graphs 702 and 802, it can be seen that there are fewer steps between target values in graph 802. However, it is difficult to see a difference between the histogram plots shown in graphs 704 and 804. The actual analysis of this histogram places $\mu_T$ at 10.07 ms (0.7% error), $\sigma$ at 0.483 ms (3.4% error), $D_{MIN}$=8.67 ms, $D_{MAX}$=12.86 ms.

Figure 11:
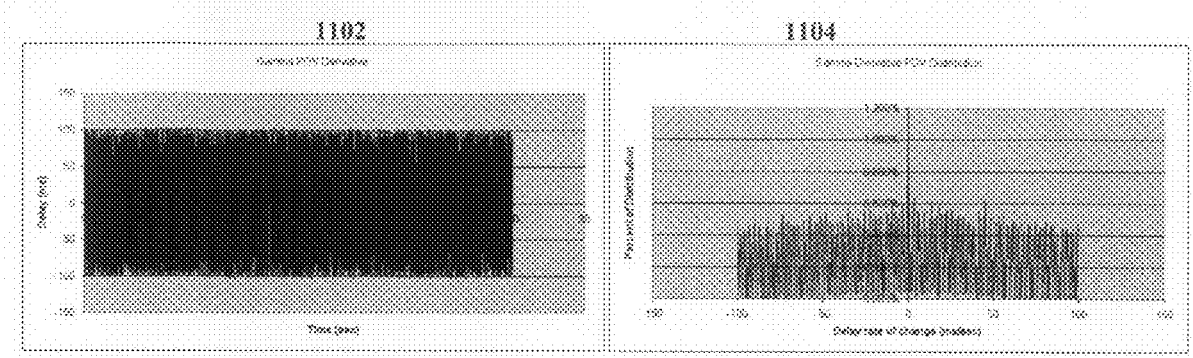
FIG. 11 illustrates derivative PDV using variable delay-steps.

FIG. 11 illustrates derivative PDV using variable delay-steps. The graphs of FIG. 11 show the derivative PDV as seen by the packet receiver 106. The derivative PDV shows the delay rate of change on a packet-by-packet basis. Graph 1102 shows the derivative PDV displayed over time, and graph 1104 shows the PDF histogram for the derivative PDV for the variable delay-step case. As illustrated in graphs 1102 and 1104, it can be seen that the delay rate of change (derivative PDV) is bounded between ±100 ms/sec. If the periodic packet rate is known (1000 packet per second in this case), then the derivative PDV bound may be divided by the packet rate to yield the minimum and maximum packet delay-step size (100 μs in this case). Based on the histogram analysis shown in graph 1104, it can be seen that this variation is uniformly distributed across this range.

Figure 12:
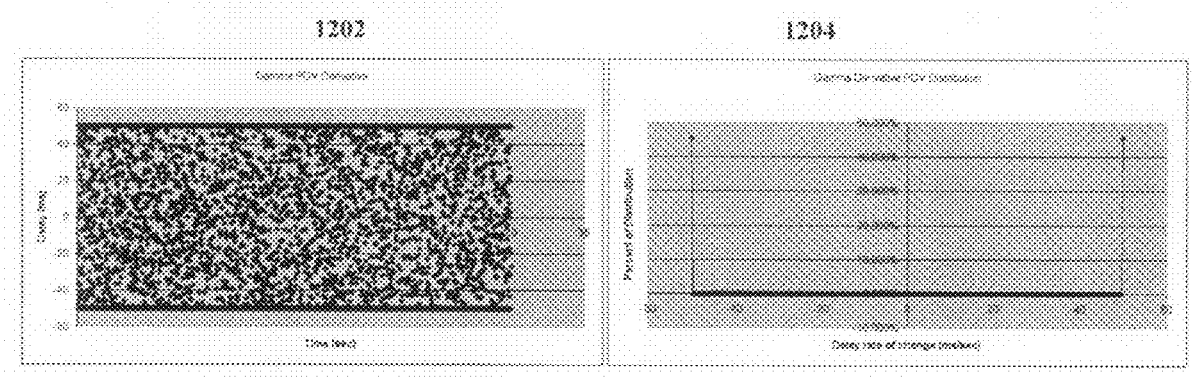
FIG. 12 illustrates derivative PDV using fixed delay-steps.

FIG. 12 illustrates derivative PDV using fixed delay-steps. Graph 1202 shows the derivative PDV displayed over time, and graph 1204 shows the PDF histogram for the derivative PDV for the fixed delay-step case. It can be seen that graphs 1202 and 1204 of FIG. 12 are very different from graphs 1102 and 1104 of FIG. 11. Graph 1202 of FIG. 12 shows that, in the fixed delay-step case, the majority of the step delay values are at either end of the min/max step range. This is also verified by the PDF histogram shown in graph 1204, which shows 90% of the delay-step change values are equally divided between the min and max step values. None of this information is evident from viewing simple PDF histograms (graphs 904 and 1004) of the PDV shown in FIGS. 9 and 10. Accordingly, the derivative PDV analysis of FIGS. 11 and 12 provides additional information that is useful in understanding how PDV changes over time. Such information may be used to not only analyze the PDV of a packet stream, but also for specifying the PDV that a timing emulation service (TES) or packet network timing (PNT) IWF should be able to tolerate while providing compliant timing recovery.

The simulations described above are based on the modeling of a Gamma PDF target generated from a single Gamma statistical distribution. However, the present invention is not limited to a single Gamma statistical distribution. For example, a more complex PDF can be created from multiple different Gamma or other statistical distributions using modified embodiments of the above described method. Such an embodiment can be implemented by selecting delay targets from multiple statistical distributions on a percent basis of available packets.

To illustrate this concept, consider a complex PDF composed of 2 Gamma PDFs: $D_{G1}(t)$ and $D_{G2}(t)$. In this case, the ratio of the available packets with delays that use $D_{G1}(t)$ is $R_{G1}(t)$ and the ratio of the available packets with delays that use $D_{G2}(t)$ is $R_{G2}(t)$. The equation that describes the total delay over time is shown in the following equation:

$$D_{Total}(t) = R_{G1}(t)D_{G1}(t) + R_{G2}(t)D_{G2}(t)$$

where $D_{G1}(t) = D_{off1} + D_{Gamma1}(U_1(t),\alpha,\beta)$, including a delay offset plus the actual Gamma PDF with shape parameter $\alpha$, scale parameter $\beta$, and uniform probability $U_1(t)$, and $D_{G2}(t) = D_{off2} + D_{Gamma2}(U_2(t),\alpha,\beta)$, including a delay offset plus the actual Gamma PDF with shape parameter $\alpha$, scale parameter $\beta$, and Uniform probability $U_2(t)$.

Another important concept is the packet-to-packet delay variation per statistical target distribution. For example, in a complex distribution where low and high delay bands are desired, it may be desired that the low delay band of packets have low delay variation and the high delay band of packets have a high delay variation. The delay-step method described above can accommodate this by allowing the direct specification on a per distribution basis of the packet-to-packet delay variation. This packet to packet delay variation may be specified as a variable value (variable step) over a fixed range or as a discrete value (fixed step) on a per distribution basis.

The delay-step method for simulating a PDV based on a statically distribution can be used to produce highly accurate delay profiles. This method supports the direct specification of various statistical parameters (Gamma $\mu$, $\sigma$, and delay offset). In addition, the packet-to-packet delay variation can also be specified as both a fixed delay target and as a uniformly variable target between two limits. This method can be further extended to support the generation of complex PDFs composed of several statistical or deterministic PDFs. This allows for a wide range of PDV profiles to be simulated using the above described delay-step method.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for simulating packet delay variation (PDV) of a network, comprising:
    receiving, by a PDV generator, a stream of packets, each packet generated at a regular interval by a packet generator;
    determining, by the PDV generator, a delay for each packet based on a series of delay target values determined based on a uniform statistical distribution; and
    transmitting, by the PDV generator, each packet over the network with the delay determined for that packet,
    wherein said statistical distribution comprises two or more probability density functions.

2. The method of claim 1, wherein said step of determining a delay for each packet comprises:
    (a) selecting a random delay target value based on a probability density function (PDF) of said statistical distribution;
    (b) adjusting the delay of sequential packets in said stream of packets by delay-steps determined based on the random delay target value, until the delay of a packet is equal to the random delay target value; and
    (c) repeating steps (a) and (b) to determine a delay value for each packet in said stream of packets.

3. The method of claim 2, wherein step (b) comprises for each of said sequential packets:
    determining a difference between a current delay for the packet and the random delay target value;
    if the difference between the current delay for the packet and the random delay target value is negative, adjusting the current delay for the packet by a delay-step determined as a uniformly distributed value between 0 and a maximum step size; and
    if the difference between the current delay for the packet and the random delay target value is positive, adjusting the current delay for the packet by a delay-step determined as a uniformly distributed value between a minimum step size and 0.

4. The method of claim 2, wherein step (b) comprises for each of said sequential packets:
    determining a difference between a current delay for the packet and the random delay target value;
    if the difference between the current delay for the packet and the random delay target value is negative, adjusting the current delay for the packet by a fixed positive delay-step; and
    if the difference between the current delay for the packet and the random delay target value is positive, adjusting the current delay for the packet by a fixed negative delay-step.

5. The method of claim 4, wherein step (b) further comprises for each of said sequential packets:
    if adjusting the current delay for the packet by the fixed positive delay-step or the fixed negative delay-step overshoots the random delay target value, adjusting the current delay for the packet to be equal to the random delay target value.

6. The method of claim 1, wherein said statistical distribution is a probability density function modeling a PDV of a packet based network.

7. The method of claim 1, wherein said statistical distribution is a Gamma distribution.

8. The method of claim 1, wherein parameters of said statistical distribution are selected by a user.

9. A system for simulating packet delay variation (PDV) of a network, comprising:
    means for generating a stream of packets such that each packet is generated at a regular interval;
    means for determining a delay for each packet based on a series of delay target values determined based on a uniform statistical distribution; and
    means for transmitting each packet over the network with the delay determined for that packet,
    wherein said statistical distribution comprises two or more probability density functions.

10. The system of claim 9, further comprising:
    means for receiving each packet transmitted with the delay determined for that packet; and
    means for analyzing PDV based on the delay of each packet.

11. The system of claim 9, wherein said means for determining a delay for each packet comprises:
    means for selecting a random delay target value based on a probability density function (PDF) of said statistical distribution; and
    means for adjusting the delay of sequential packets in said stream of packets by delay-steps determined based on the random delay target value, until the delay of a packet is equal to the random delay target value.

12. The system of claim 11, wherein said means for adjusting comprises:
    means for determining a difference between a current delay for a packet and the random delay target value; and
    means for adjusting the current delay of the packet by a delay-step determined as a uniformly distributed value between a minimum step size and a maximum step size based on the difference between the current delay for the packet and the random delay target value.

13. The system of claim 11, wherein said means for adjusting comprises:
    means for determining a difference between a current delay for a packet and the random delay target value; and
    means for adjusting the current delay of the packet by one of a fixed positive delay-step and a fixed negative delay-step based on the difference between the current delay for the packet and the random delay target value.

14. The system of claim 9, wherein said statistical distribution is a Gamma distribution.

15. The system of claim 9, further comprising:
    means for receiving user inputs defining parameters of said statistical distribution.

16. A non-transitory computer readable medium storing computer executable instructions for simulating packet delay variation (PDV) of a network, said computer executable instructions defining steps comprising:
    receiving a stream of packets, each packet generated at a regular interval by a packet generator;
    determining a delay for each packet based on a series of delay target values determined based on a uniform statistical distribution; and
    transmitting each packet over the network with the delay determined for that packet,
    wherein said statistical distribution comprises two or more probability density functions.

17. The non-transitory computer readable medium of claim 16, wherein the computer executable instructions defining the step of determining a delay for each packet comprise computer executable instructions defining the steps of:

(a) selecting a random delay target value based on a probability density function (PDF) of said statistical distribution;

(b) adjusting the delay of sequential packets in said stream of packets by delay-steps determined based on the random delay target value, until the delay of a packet is equal to the random delay target value; and (c) repeating steps (a) and (b) to determine a delay value for each packet in said stream of packets.

18. The non-transitory computer readable medium of claim 17, wherein the computer executable instructions defining step (b) comprise computer executable instructions defining the following steps for each of said sequential packets:

determining a difference between a current delay for the packet and the random delay target value;

if the difference between the current delay for the packet and the random delay target value is negative, adjusting the current delay for the packet by a delay-step determined as a uniformly distributed value between 0 and a maximum step size; and if the difference between the current delay for the packet and the random delay target value is positive, adjusting the current delay for the packet by a delay-step determined as a uniformly distributed value between a minimum step size and 0.

19. The non-transitory computer readable medium of claim 17, wherein the computer executable instructions defining step (b) comprise computer executable instructions defining the following steps for each of said sequential packets:

determining a difference between a current delay for the packet and the random delay target value;

if the difference between the current delay for the packet and the random delay target value is negative, adjusting the current delay for the packet by a fixed positive delay-step; and if the difference between the current delay for the packet and the random delay target value is positive, adjusting the current delay for the packet by a fixed negative delay-step.

20. The non-transitory computer readable medium of claim 19, wherein the computer executable instructions defining step (b) further comprise computer executable instructions defining the following step for each of said sequential packets:

if adjusting the current delay for the packet by the fixed positive delay-step or the fixed negative delay-step overshoots the random delay target value, adjusting the current delay for the packet to be equal to the random delay target value.

21. The non-transitory computer readable medium of claim 16, wherein said statistical distribution is a Gamma distribution.

22. The non-transitory computer readable medium of claim 16, further comprising computer executable instructions defining the steps of:

receiving each packet transmitted with the delay determined for that packet; and analyzing PDV based on the delay of each packet.

\* \* \* \* \*